Patented Oct. 14, 1941

2,259,414

UNITED STATES PATENT OFFICE 2,259,414

PREPARATION OF COMPLEX DIARYL GUANIDINE METAL SALT ADDITION COMPOUNDS

Arnold R. Davis, Old Greenwich, Conn., assignor to American Cyanamid Company, New York, N. Y., a corporation of Maine No Drawing. Application August 3, 1940, Serial No. 351,155

7 Claims. (Cl. 260—429)

This invention relates to a method of preparing complex diaryl guanidine addition products of the type described in my copending application, Serial No. 351,156, filed concurrently herewith. I have found that the complex addition products obtainable by reacting diaryl guanidines with zinc chloride and aluminum chloride $AlCl_3.6H_2O$ described in that application can be prepared in a form requiring little or no further purification by a solvent process, and this process constitutes the subject matter of the present application. My present process, as applied to the preparation of complex addition products of diaryl guanidines with zinc chloride and aluminum chloride, is essentially the same as the process described in my copending application, Serial No. 223,206, filed August 5, 1938, and the present application is a continuation-in-part of that case.

I have found that complex diaryl guanidine addition products of the formula $(ArG)_3AlCl_3$
$(ArG)_2ZnCl_2$ in which ArG is a diaryl guanidine such as diphenyl guanidine, di-o-tolyl guanidine, phenyl-o-tolyl guanidine and the like can be prepared by dissolving the metal chloride in alcohol, such as methyl or ethyl alcohol, and reacting the guanidine therewith, either as such or in the form of an alcoholic solution. The complex addition product is formed at elevated temperatures by heating the alcoholic solution to its boiling point, preferably with refluxing for ½ to 1 hour, and the excess alcohol is then preferably removed by distillation or evaporation.

As is described in my copending application above referred to, the activating properties of my new complex addition products for rubber accelerators are greatly improved when the complex product is obtained in the glassy, resin-like amorphous state, and the present process is especially well adapted for obtaining the products in this form. Thus, for example, the alcoholic solution of the product may be evaporated to complete dryness and the heating continued until the resulting solid product is fused at a temperature slightly above its melting point, but below the temperature of decomposition of the diaryl guanidine which it contains. Alternately, only a part of the alcohol may be evaporated and certain of the complex addition products obtained by crystallization, and these products may then be fused as before. In both cases, however, it is an advantage of my invention that substantially quantitative yields of a pure product are obtained.

The invention will be illustrated in greater detail by the following specific examples, parts being by weight. It should be understood, however, that although these examples may describe some of the more specific details of the invention they are given primarily for purposes of illustration and the invention in its broader aspects is not limited thereto.

Example 1

An alcoholic solution containing 422 grams (2 mols) of diphenyl guanidine was made up, and to this solution was added 136.4 grams (1 mol) of zinc chloride, which had likewise been previously dissolved in alcohol. The combined solutions were heated slowly to evaporate off the alcohol and yet avoid overheating. The product obtained upon evaporation to dryness was a clear resin-like amorphous mass, which powdered up readily, and showed no hygroscopic properties. This powder softened when heated to above 84° C.

To test the utility of the diphenyl guanidine-zinc chloride complex, the following samples were made up and tested. Equivalent ratios of the complex material and diphenyl guanidine alone were used in the samples.

|  | Sample A | Sample B |
|---|---|---|
| Smoked rubber sheets | 100 | 100 |
| Zinc oxide | 6 | 6 |
| Sulfur | 3 | 3 |
| Benzothiazyl disulfide | 0.75 | 0.75 |
| Diphenyl guanidine |  | 0.445 |
| Diphenyl guanidine.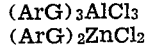$ZnCl_2$ combination | 0.59 |  |

These samples were then tested in a Williams plastometer using a three minute $y$ value in inches at 100° C. The higher the percentage change in the $y$ value on heating, the faster the rate of set up or premature vulcanization.

|  | Williams 3 min. $y$ at 100° C. | | Change | |
|---|---|---|---|---|
|  | A | B | A | B |
|  |  |  | Percent | Percent |
| After mixing | .069 | .073 |  |  |
| After 1.5 hours at 85° C. in water | .078 | .194 | +13.1 | +166 |
| After 2.0 hours at 85° C. in water | .133 | .297 | +93 | +307 |

From the above table it may readily be seen that diphenyl guanidine alone has a much faster rate of premature vulcanization than my new diphenyl guanidine-zinc chloride combination.

The following tests were then run to show the comparative effects of my new product and of diphenyl guanidine on the samples at full cure.

|  | A | B |
|---|---|---|
| 10 min./130° C.: | | |
| Stress in lbs./sq. in. at 500% elongation | 875 | 1135 |
| Tensile strength at break | 5050 | 5485 |
| Percent elongation | 795 | 780 |
| 25 min./130° C.: | | |
| Stress in lbs./sq. in. at 500% elongation | 1570 | 1630 |
| Tensile strength at break | 4985 | 5185 |
| Percent elongation | 695 | 690 |
| 40 min./130° C.: | | |
| Stress in lbs./sq. in. at 500% elongation | 1700 | 1925 |
| Tensile strength at break | 4610 | 4560 |
| Percent elongation | 690 | 660 |

From the above tests it may be seen that the physical properties of the two samples were practically the same at full cure.

*Example 2*

The amorphous di-o-tolyl guanidine-zinc chloride complex was prepared in the same manner as the diphenyl complex described in Example 1 with the mere substitution of di-o-tolyl guanidine for diphenyl guanidine. A rubber sample was then compounded containing 100 parts smoked sheets, 6 parts zinc oxide, 3 parts sulfur, 0.75 part benzothiazyl disulfide and 0.59 part of (DPG)$_2$ZnCl$_2$. Tests made on this composition in the manner described in Example 1 showed that the di-o-tolyl guanidine-zinc chloride product gave an even slower rate of set-up, or premature vulcanization, than the diphenyl guanidine complex.

What I claim is:

1. A process of preparing a complex addition compound of a diaryl guanidine and a salt of the group consisting of zinc chloride and hydrated aluminum chloride which comprises dissolving the metal chloride in alcohol, adding the diaryl guanidine thereto, heating the mixture to bring about reaction between the metal salt and the diaryl guanidine and continuing the heating until the alcohol has been substantially removed from the mass and a fused mass is obtained.

2. A process of preparing a complex addition compound of a diaryl guanidine and a salt of the group consisting of zinc chloride and hydrated aluminum chloride which comprises, dissolving the metal chloride in alcohol, adding the diaryl guanidine in solid form thereto, heating the mixture under reflux to bring about reaction between the metal salt and the diaryl guanidine, and distilling off the alcohol until a substantially dry and fused mass is obtained.

3. The process of claim 2, wherein the metal salt is zinc chloride.

4. The process of claim 2, wherein the diaryl guanidine is di-o-tolyl guanidine and the metal salt is zinc chloride.

5. The process of preparing the complex addition compounds of a diaryl guanidine and a salt of the group consisting of zinc chloride and hydrated aluminum chloride which comprises, dissolving the diaryl guanidine and the metal salt in separate quantities of alcohol, combining the resulting solutions and slowly heating the combined solutions to dryness and to fuse the residue.

6. The process of claim 5, wherein the metal salt is zinc chloride.

7. The process of claim 5, wherein the diaryl guanidine is di-o-tolyl guanidine and the metal salt is zinc chloride.

ARNOLD R. DAVIS.